Figure 1:
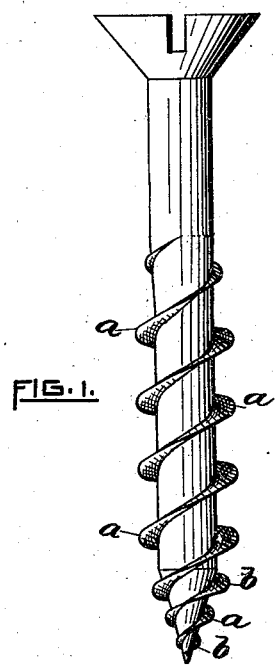

(No Model.)

C. D. ROGERS.
WOOD SCREW.

No. 408,531. Patented Aug. 6, 1889.

WITNESSES,
Charles Hannigan
Herbert F. Tourtellot.

INVENTOR,
Charles D. Rogers.
by Remington & Henthorn
Attys.

UNITED STATES PATENT OFFICE.

CHARLES D. ROGERS, OF PROVIDENCE, RHODE ISLAND, ASSIGNOR TO THE AMERICAN SCREW COMPANY, OF SAME PLACE.

WOOD-SCREW.

SPECIFICATION forming part of Letters Patent No. 408,531, dated August 6, 1889.

Application filed April 6, 1889. Serial No. 306,177. (No model.)

*To all whom it may concern:*

Be it known that I, CHARLES D. ROGERS, a citizen of the United States, residing at Providence, in the county of Providence and State of Rhode Island, have invented certain new and useful Improvements in Wood-Screws; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the common wood-screws the pitch of the threads is such that the screw makes but small advance at each turn. If, to make a screw advance more rapidly, the pitch is increased without changing the size or shape of the thread, the groove between the threads must be increased. By increasing the pitch of the thread the hold on the wood is diminished. It is important in many cases not to do this at the point, where by reason of the small diameter the hold of the thread is much weaker than at the cylindrical part of the screw. I have provided for these cases by forming auxiliary or supplementary threads between the threads which are extended from the body of the screw. This improvement is shown in the drawings, in which—

Figure 2:
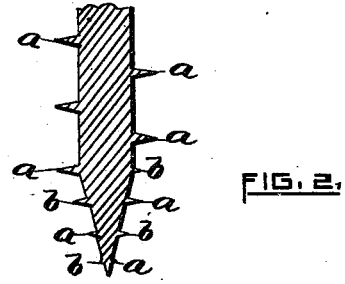

Figure 1 is an elevation of a screw with my improvement, and Fig. 2 a longitudinal section of its point portion.

The main thread, extending from the cylindrical portion to the point, is indicated by $a$, and the auxiliary thread by $b$, lying in the space between the main thread. These screws can be formed by cutting away the metal, but can be most conveniently made by rolling in the manner described in my United States Patent No. 370,354, issued September 20, 1887.

I claim—

A screw provided with one or more threads about its body or cylindrical portion and with one or more auxiliary threads upon its pointed or conical portion between the threads extending from the body.

In testimony whereof I have affixed my signature in presence of two witnesses.

CHARLES D. ROGERS.

Witnesses:
CHARLES HANNIGAN,
GEO. H. REMINGTON.